THREE PIECE BOBBIN OF DIELECTRIC MATERIAL FOR ELECTRIC COILS
Original Filed Oct. 5, 1959
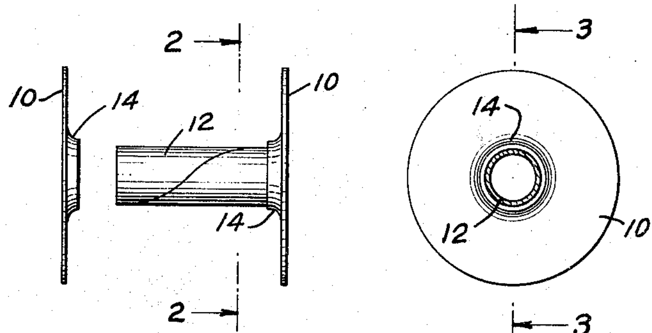
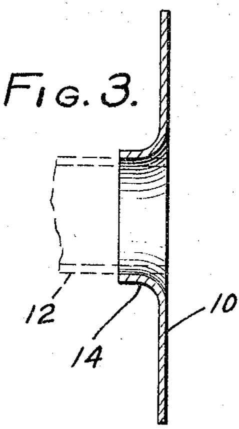
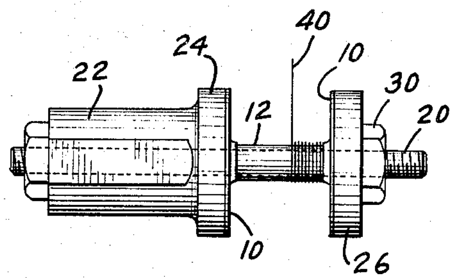
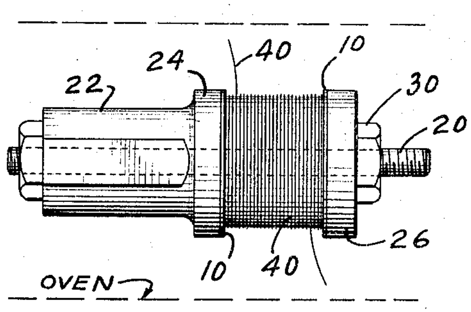
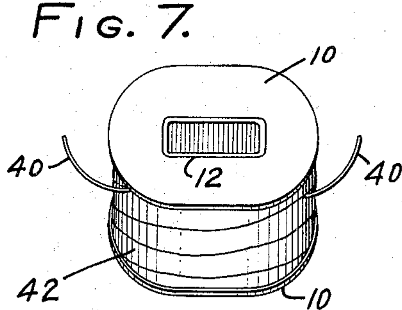
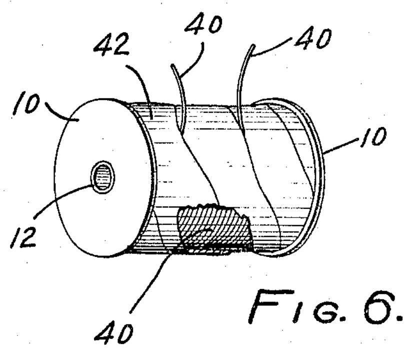
INVENTOR.
OTTO N. BLOOM
BY [signature]
ATTORNEY United States Patent Office — 3,215,905 — Patented Nov. 2, 1965

3,215,905

THREE PIECE BOBBIN OF DIELECTRIC MATERIAL FOR ELECTRIC COILS

Otto N. Bloom, Rosemead, Calif.

Continuation of application Ser. No. 844,384, Oct. 5, 1959. This application Dec. 16, 1963, Ser. No. 331,648
1 Claim. (Cl. 317—158)

This invention pertains to electric coils, more particularly to electric coils of the small and miniature types, and this application is a continuation of my application Serial No. 844,384, filed October 5, 1959 now abandoned.

There is no set and clear understanding in the trade as to the maximum limits of a "small," or of a "miniature" coil. My understanding and use of the terms is that "miniature" embraces all coils having an outside diameter of less than one half inch; and that "small" coils are all those between one-half and one and one-fourth inches in outside diameter.

Over the past two decades there has been an increasing demand for and trend toward greater compactness and lightness of control apparatus, such as relays, solenoids, contactors, electro-mechanical actuators, resonant tuning devices, etc., and this trend has brought about a demand for smaller and lighter electric coils having equal or even greater electrical strength than heretofore.

The present invention is a response to the aforementioned demand, and is characterized, in the main, (1) in the use of an exceptionally thin dielectric bobbin of novel construction which needs contribute only its dielectric function, rather than serving to support the coil in the manner of prior practice, thus providing considerably more space for the winding in a coil of the same over-all dimensions of corresponding prior coils; (2) the coil is free of the usual internal stresses built up during the winding thereof; the contacting turns or convolutions of my coil adhere to one another, the combination of characteristics (2) and (3) thus providing a coil that is compact, rigid and requires no support from the bobbin, coil is relieved of the internal stresses built up during the winding thereof; (4) the present coil in its intended use will not liberate any deleterious gas.

Prior to the present invention the idea had prevailed and become standard practice in the coil art that while for some uses, the bobbin could be made somewhat thin, it should never be made so thin as to sacrifice the strength and rigidity required for supporting the winding. A typical expression of this attitude of rigid bobbins is set forth in detail in lines 27–32 of the patent to Wyss, 1,953,035 in regard to his paper or fibre bobbin. Patent Number 2,856,639, of Forrest et al., discloses the use of a bobbin of sturdy epoxy "resin of thin wall section, say 0.030 inch thick," and the Du Pont Company managed to duplicate in nylon by injection molding tiny conventional telephone coil bobbins of 0.012 inch thickness and which were formerly composed of laminated paper of the thickness just mentioned held together by phenol cement (Fortune, June 1945). Other patentees, of whom Warnken No. 2,459,605 is typical, recognize that the aim in the past has been to employ as thin a bobbin as possible "without sacrificing strength and rigidity," and while this patentee and a few others discard bobbins altogether, they rely upon cementing the turns together, or employing an otherwise needlessly thick insulation sheath on the wire and fusing together the tacky turns to obtain solidity and rigidity of the coil. Omission of bobbins, inter alia, exposes the coil to abrasion, and complicate the manufacturing procedure, while the cement adds weight and consumes space which otherwise could receive additional winding, and, besides cements contribute to out-gassing.

With the foregoing in mind, it is the principal object of this invention to provide smaller coils of the type aforementioned, yet carrying at least as many ampere-turns as heretofore; and, conversely, to provide in a coil of the same over-all dimensions as prior coils an increased number of ampere turns of a larger guage wire, thus not increasing the electrical resistance of the coil.

A further object of my invention is to provide a coil the contiguous turns of which adhere to one another to give rigidity and self-supporting character thereto, rendering the coil or winding immune to accidental displacement of any of the turns thereof.

A still further object of this invention is to provide a coil of the kind mentioned in the preceding paragraph wound upon an exceptionally thin bobbin of novel design and possessing the needed dielectric and abrasion protecting qualities, thus affording more space for the winding, whereby substantially more ampere turns may be wound thereon as compared with prior bobbins of corresponding size.

A still further object of this invention is to provide a coil the turns of which are free of internal winding stresses.

Yet another object of this invention is to provide a coil which is extremely rugged, and will not liberate deleterious gas when used in the environment for which it is designed.

Another object of this invention is to provide a coil for relays of the same or less over-all dimensions of prior coils, yet having greatly increased pull-in power, thereby eliminating a great deal of the necessity for fine adjustments of relays previously necessary during assembly.

Lesser objects of this invention will become apparent from the description and accompanying drawings.

In general, I accomplish the foregoing objects by winding a provisionally insulated strand of wire onto an exceptionally thin bobbin of dielectric material while the bobbin is supported upon a mandrel, the bobbin being so thin as to lend no material support to the wire. The coil while still on the mandrel is subjected to heat treatment, preferably under vacuum, to relieve all stress from the turns of the winding, and coincidentally, to drive off all substances in the coil that may liberate objectionable gas or contaminants during use of the coil and which might foul the contact points of an enclosed group of relays. Upon slowly cooling to room temperature, the turns of the coil adhere to one another sufficiently to present a rigid, self-supporting coil.

The invention will now be set forth in detail, to be read in conjunction with the accompanying drawings, in which:

FIG. 1 depicts, in elevation, a bobbin used in the power coil of this invention, with the left hand flange shown displaced axially from the bobbin cylinder;

FIG. 2 is a cross-section taken along section line 2—2 of FIG. 1;

FIG. 3 is an enlarged section, taken along section line 3—3 of FIG. 2;

FIG. 4 is an elevation of a form of bobbin holder employed in the winding and heat treatment of the coil of this invention;

FIG. 5 is an elevation showing a coil wound on a bobbin which in turn is mounted on the holder of FIG. 4 and ready for placement in an oven for heat treatment;

FIG. 6 is a perspective in full scale of a completed small coil according to the present invention; a portion of the outer cover or wrapping being broken away; and FIG. 7 is a perspective showing in an enlarged scale of the present invention as applied to the type of bobbin of the Du Pont Company, referred to supra.

The improved three-part bobbin forming part of my invention is illustrated in FIGS. 1–3. This bobbin is shown as comprised of a tubular cylinder 12 having an annular flange 10 mounted on each end thereof. The cross-sectional shape of the tubular member, and the configuration of the flanges may be varied, of course, as indicated in FIG. 7. Both the cylinder and flanges are formed of exceptionally thin dielectric material, thereby affording additional space for receiving winding, with no increase over the over-all dimensions of corresponding prior bobbins. The term "exceptionally thin" is used herein in the dictionary sense of "extraordinary, unusual," and it has comparative reference to the extrordinary thinness of the bobbins herein disclosed, in relation to the thickness of any and all prior corresponding bobbins employed in each of the multitude of coil size categories.

In developing the present invention I found it impractical, if not impossible, to mold, machine, or abrade a one-piece bobbin to the thinness herein contemplated for use in small and miniature coils, and my research led to the concept of the bobbin herein disclosed, in which the flanges are made separate and slid onto the ends of the cylinder 12.

It will be noted that the flange 10 about its central opening is formed with an inwardly extending continuous cylindrical sleeve portion 14 for establishing a nice fit of the sleeve onto the cylinder. Because of the extreme thinness of sleeves 14 they may be compressed or deformed to grip the cylinder and, as will appear hereinafter, the sleeves are to become thus fixed to cylinder 12 during the winding of the coil thereon, whereupon the bobbin functions as an integral one-piece structure.

The bobbin may be made of any material that may be formed practically into an exceptionally thin bobbin which possesses the requisite dielectric strength.

By reason of the exceptional thinness of the bobbins herein disclosed, additional coil space is provided, and it is therefore possible to wind upon a smaller bobbin considerably more turns of wire than is possible under standard practice with the thinnest prior bobbin of the same over-all dimensions. This addition in ampere turns is reflected in increased pull-in strength of the coil, and when used in a relay, many of the usual fine adjustments formerly involved in the manufacture of relays are obviated. Conversely, in accordance with the present invention, on an exceptionally thin bobbin of the same over-all dimensions of prior bobbins, I am able to apply an increased number of turns of at least one size larger wire, thus increasing the ampere-turns without adding to the resistance of the coil.

It follows from the foregoing considerations that substantial benefits of the present invention are obtained when the wall thickness of the bobbin is sufficiently less than that of corresponding prior bobbins of substantially identical over-all dimensions as to accommodate thereon at least an equal number of turns of wire of at least one size larger gauge than employed on said prior bobbins; or conversely, when the thinness of the bobbin allows substantial reduction in the size of a coil while still carrying at least as many turns as before. The optimum benefits of my invention are obtained when the thickness of a particular bobbin is merely sufficient to afford the needed dielectric strength for the coil.

As shown in FIG. 4 in winding my bobbin, cylinder 12 with its flanges thereon, is mounted upon a metal shaft or mandrel 20, the latter comprising part of a unit 22 adapted to be installed on a winding mechanism. Unit 22 includes a rigid inner disk portion 24 formed as part thereof, and a second annular outer disk 26, the latter being adjustable along shaft 20. Shaft 20 is threaded on its end portions and nuts 30 on opposite ends thereof may be adjusted to position the disks contiguous flanges 10. Disks 24, 26 thus buttress and confine the flanges during the winding operation and prevent bulging of the ends of the coil during manufacture.

When the bobbin is assembled on the mandrel 20 and the buttressing disks 24, 26 are properly positioned with respect to the flanges of the bobbin, a highly conductive wire provisionally coated or sheathed with insulation is wound back and forth thereon with the turns extending circumferentially of the bobbin. As the wire 40 is traversed back and forth along cylinder 12 and onto sleeves 14, the winding tension causes the turns of the wire to grip the cylinder and sleeves 14, and compress the sleeves into gripping engagement with cylinder 12.

After winding and applying the final wrapping 42 about the coil, the unit 22 is placed in an oven, where it is subjected to controlled temperature, preferably under vacuum, for a predetermined time. The primary purpose of the heat treatment is to normalize the wire; that is to say, to relieve it of internal stresses. The heat treatment, however, performs further functions including driving off all volatile substances which the wire has picked up, as will presently be explained.

In drawing wire and its subsequent handling in the manufacture of coils, the cutting oil, as well as body oils, and sometimes acids, as well as other contaminants, adhere to the wire and heretofore have been incorporated in the finished coils. These substances have a tendency to volatilize and escape in the form of a gas or vapor—herein termed "out-gassing"—when the temperature of the coil is raised beyond the volatilizing point of said substances. This gas may condense on or otherwise accumulate about the contact points of a relay and cause failure thereof, particularly where several relays are sealed within a small housing. As an adjunct to the heat treatment mentioned above, especially when carried out under vacuum, my coils are cleared of all outgassing substances likely to be released in usage up to the temperature of the heat treatment.

After the heat treatment, there is sufficient adherence between the contacting turns of the winding to retain its original shape, and this adherence is of such magnitude that accidental displacement of the turns becomes praccally impossible. It is believed this adherence is due to a rearrangement of the molecules in the wire as well as in the insulation thereon giving it a set. The adherence is present regardless of the kind of insulation employed on the wire; though some types of insulation do aid in the rigidity of the coil. Since stresses within the coil have been relieved by said heat treatment, wire breakage, cold flow, shorted turns and open circuits are virtually eliminated.

The aforementioned adherence of the turns of my coil is of major importance in that the coil requires no support from the bobbin, thus permitting use of exceptionally thin bobbins of just sufficient thickness to offer the needed dielectric strength, resulting in more coil space on the bobbin.

The duration of the heat treatment will vary somewhat, as pointed out in my copending process application Ser. No. 166,736, filed Jan. 9, 1962, now Patent No. 3,159,907, depending upon the guage of the wire and number of turns, as well as the material of which the bobbin and the sheath for the wire is formed and the temperature applied.

Toward the end of the heat treatment, and while the coil is still under vacuum, I introduce an inert gas into the vacuum chamber for penetration into any interstices of the coil upon relieving the vacuum. This inert gas should be completely dry, thereby eliminating any possibility of moisture entering the coil.

I claim:

An electric coil of the kind disclosed comprising an exceptionally thin three-part bobbin of a dielectric material, said bobbin consisting of a straight tubular member and end flanges, each flange being formed with a central opening receiving an end of said tubular member and the opposed face of each flange having formed integrally about its central opening a continuous, deformable tubular sleeve portion extending part way along said tubular member, a winding of insulated wire encircling said bobbin and filling the space between said flanges and compressing said sleeve portions into gripping engagement with said tubular member, said winding being free of internal stresses and the turns thereof contacting and adhering to one another to define a rigid, self-supporting winding not subject to distortion from internal stresses and capable of preserving its shape against accidental displacement.

References Cited by the Examiner

UNITED STATES PATENTS

| | | | |
|---|---|---|---|
| 1,867,362 | 7/32 | Lathrop | 336—213 |
| 1,944,870 | 1/34 | Apple | 336—192 |
| 1,953,035 | 3/34 | Wyss | 336—208 |
| 2,501,349 | 3/50 | Nagel et al. | 336—213 |
| 2,946,973 | 7/60 | Lufcy | 336—213 |

FOREIGN PATENTS

| | | |
|---|---|---|
| 4,306 | 10/80 | Great Britain. |

OTHER REFERENCES

Coilforms of Nylon—advertisement appearing in Fortune, June 1945; U.S. News, June 1, 1945, and Business Week, June 30, 1945.

BERNARD A. GILHEANY, *Primary Examiner.*

JOHN F. BURNS, *Examiner.*